United States Patent
Mostek et al.

(10) Patent No.: US 12,529,887 B1
(45) Date of Patent: Jan. 20, 2026

(54) OPTOMECHANICAL RELAY SYSTEM AND METHOD FOR RAPID FILTER SWITCHING

(71) Applicant: BAE Systems Space & Mission Systems Inc., Broomfield, CO (US)

(72) Inventors: Nicholas J. Mostek, Westminster, CO (US); Brian C. Primeau, Boulder, CO (US); David M. Waller, Westminster, CO (US)

(73) Assignee: BAE Systems Space & Mission Systems Inc., Broomfield, CO (US)

( * ) Notice: Subject to any disclaimer, the term of this patent is extended or adjusted under 35 U.S.C. 154(b) by 575 days.

(21) Appl. No.: 17/960,195

(22) Filed: Oct. 5, 2022

Related U.S. Application Data

(60) Provisional application No. 63/254,439, filed on Oct. 11, 2021.

(51) Int. Cl.

| G02B 26/08 | (2006.01) |
| G02B 5/20 | (2006.01) |
| G02B 5/26 | (2006.01) |
| G02B 17/00 | (2006.01) |
| G02B 13/00 | (2006.01) |
| H04N 23/55 | (2023.01) |

(52) U.S. Cl.
CPC ......... *G02B 26/0816* (2013.01); *G02B 5/201* (2013.01); *G02B 5/26* (2013.01); *G02B 17/008* (2013.01); *G02B 13/0095* (2013.01); *G02B 26/0875* (2013.01); *H04N 23/55* (2023.01)

(58) Field of Classification Search
CPC ...... G02B 26/0816; G02B 5/201; G02B 5/26; G02B 17/008; G02B 13/0095; G02B 26/0875; H04N 23/55
See application file for complete search history.

(56) References Cited

U.S. PATENT DOCUMENTS

| 5,300,780 | A | 4/1994 | Denney et al. |
| 5,892,612 | A * | 4/1999 | Miller ................. G02F 1/13473 359/252 |
| 8,172,399 | B2 | 5/2012 | Decusatis et al. |
| 8,223,206 | B2 | 7/2012 | Cromwell et al. |
| 8,436,296 | B2 | 5/2013 | Ford et al. |
| 8,934,098 | B2 | 1/2015 | Cox et al. |
| 9,618,737 | B2 | 4/2017 | Khan et al. |
| 9,854,180 | B2 | 12/2017 | Davis et al. |
| 9,910,301 | B2 | 3/2018 | Branda et al. |
| 11,388,359 | B2 | 7/2022 | Zuleta et al. |

(Continued)

*Primary Examiner* — Bumsuk Won
*Assistant Examiner* — John Curtis Sipes
(74) *Attorney, Agent, or Firm* — Sheridan Ross P.C.

(57) ABSTRACT

Optomechanical relay systems and methods for rapid filter switching are provided. More particularly, optical filter systems and methods that enable one of a plurality of filter elements to be applied to light comprising an entire image or scene collected by an imaging system are provided. The optical filter systems include steering elements at the input and exit pupils of the system. The filter elements are provided as part of a filter array having a location that is fixed relative to the input and exit pupils. The steering element at the input pupil directs the received image towards an area of the fixed filter array in which a filter element that provides the desired filter effect is located. The steering element at the exit pupil directs the filtered light to a receiving system, such as an image sensor.

25 Claims, 10 Drawing Sheets

(56) References Cited

U.S. PATENT DOCUMENTS

| | | | |
|---|---|---|---|
| 2012/0215155 A1* | 8/2012 | Muller | A61F 9/0079 |
| | | | 604/20 |
| 2014/0226204 A1* | 8/2014 | Mitzkus | G02B 21/06 |
| | | | 359/862 |
| 2015/0130962 A1* | 5/2015 | Hiramoto | H04N 23/125 |
| | | | 348/222.1 |
| 2020/0233127 A1* | 7/2020 | Ono | H04N 23/55 |
| 2021/0072081 A1* | 3/2021 | Wang | G01J 3/2803 |
| 2023/0359004 A1* | 11/2023 | Niu | G03B 17/17 |

* cited by examiner

OPTOMECHANICAL RELAY SYSTEM AND METHOD FOR RAPID FILTER SWITCHING

CROSS-REFERENCE TO RELATED APPLICATION

This application claims the benefit of U.S. Provisional Patent Application Ser. No. 63/254,439, filed Oct. 11, 2021, the entire disclosure of which is hereby incorporated herein by reference.

FIELD

This disclosure is directed to systems and methods that enable rapid filter switching in optical systems.

BACKGROUND

It is often desirable to selectively filter light provided to imaging systems. In many optical sensor systems with a two-dimensional framing array sensor, including systems operational at visible through infrared wavelengths, wavelength selection is achieved by placing a transmissive filter in the optical beam path between the entrance pupil of the optical system and the receiving sensor, thereby limiting the wavelength band of photons detected by the sensor. In such an arrangement, the selection of different bands requires physically removing the current filter in the optical path (if any) of the instrument and placing a new transmissive filter into the same or nearly the same location. The standard practice generally performs this filter switching at or near a collimated beam to restrict the waveband for the entire optical field of view and minimize optical artifacts in the transmitted image. A typical implementation of moving a waveband-selecting filter or multiple filters into an optical path uses a wheel of filters that rotate into and out of the optical beam based upon the user selected waveband. Switching between wavelength bands over the full optical field of view is limited by the time required to remove the filter from the band, cycle to the new waveband of interest, and place the new filter into the optical path.

Another standard practice for wavelength selection is to use a single fixed filter having different areas with different filter characteristics that is placed near (e.g. directly in front of) the sensor focal plane. Accordingly, different areas of the image sensor receive light that has been filtered differently than other areas. This practice restricts the waveband for only a portion of the optical field of view; the optical system must therefore change its pointing angle to collect a single waveband over the full optical field of view. Switching wavebands over the full optical field of view is limited by the agility of the optical system to change pointing angles to all field points sized by the physical dimensions of the filter and the sensor field of view.

SUMMARY

Embodiments of the present disclosure provide novel systems and methods that steer the full optical field of view of an image received from an imaging system or telescope to selected areas of a fixed, patterned filter located at an intermediate focal plane. In particular, an optical filter system incorporating an optomechanical relay is provided that selectively steers light encompassing an entire scene or field of view to a portion of a patterned filter having a desired filter characteristic. The filtered light from the entire scene is then output, for example to an image sensor or other optical system.

In accordance with embodiments of the present disclosure, the light encompassing the scene is delivered to the optical filter system as collimated light. The collimated light is received at a first steering element, such as a first fast steering mirror, at an input to the optical filter system. The first steering element enables the light to be directed such that it is incident on an area of a patterned filter element having the desired filter characteristics. More particularly, the light from the steering mirror is delivered to the selected filter element by a series of reflective or refractive elements such that the light is telecentric at the filter element. The filtered light is then delivered to a second steering element, such as a second fast steering mirror, at an output from the optical filter system. The use of steering mirrors at the entrance and exit pupils provides an optomechanical advantage, as they move the optical beam to commanded filters rather than physically moving filters into the beam path. Accordingly, embodiments of the present disclosure improve full-field waveband switching times over other methods for presenting different filters to collected light.

Additional features and advantages of embodiments of the disclosed systems and methods will become more readily apparent from the following description, particularly when taken together with the accompanying drawings.

DETAILED DESCRIPTION

Figure 1:
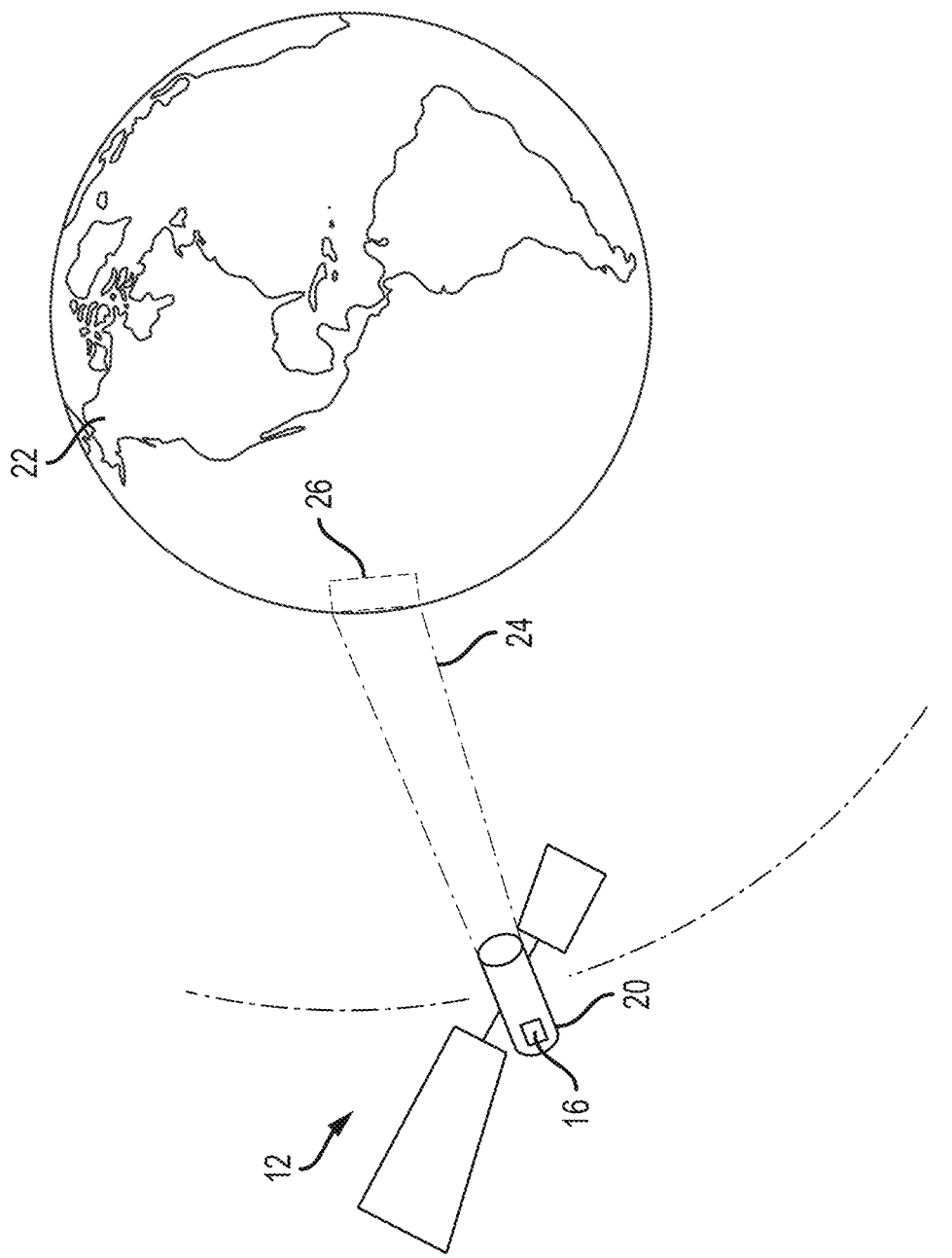
FIG. 1 depicts an imaging system incorporating an instrument having an optical filter system in accordance with embodiments of the present disclosure in an exemplary operating scenario.

FIG. 1 depicts a system 12 incorporating an optical instrument 16 having an optical filter system in accordance with embodiments of the present disclosure in an exemplary operating scenario. In this example, the optical instrument 16 is carried by a platform or vehicle 20 that is orbiting the earth 22. From such a position, a field of view 24 of the optical instrument 16 can be directed so as to collect light from within a scene. For example, the field of view 24 can be directed so as to encompass a selected area 26 of the surface of the earth 22 or of the atmosphere surrounding the earth 22. Alternatively, the field of view 24 can be directed to encompass other celestial objects or selected areas of space. In accordance with other examples, the system 12 need not be on a space based platform or in orbit, and can instead be in any location or scenario in which light is collected and filtered. In accordance with at least some embodiments of the present disclosure, the optical instrument 16 is an imaging system. Moreover, the field of view 24 can correspond to a full or entire frame of an image sensor of the optical instrument 16.

Figure 2A:
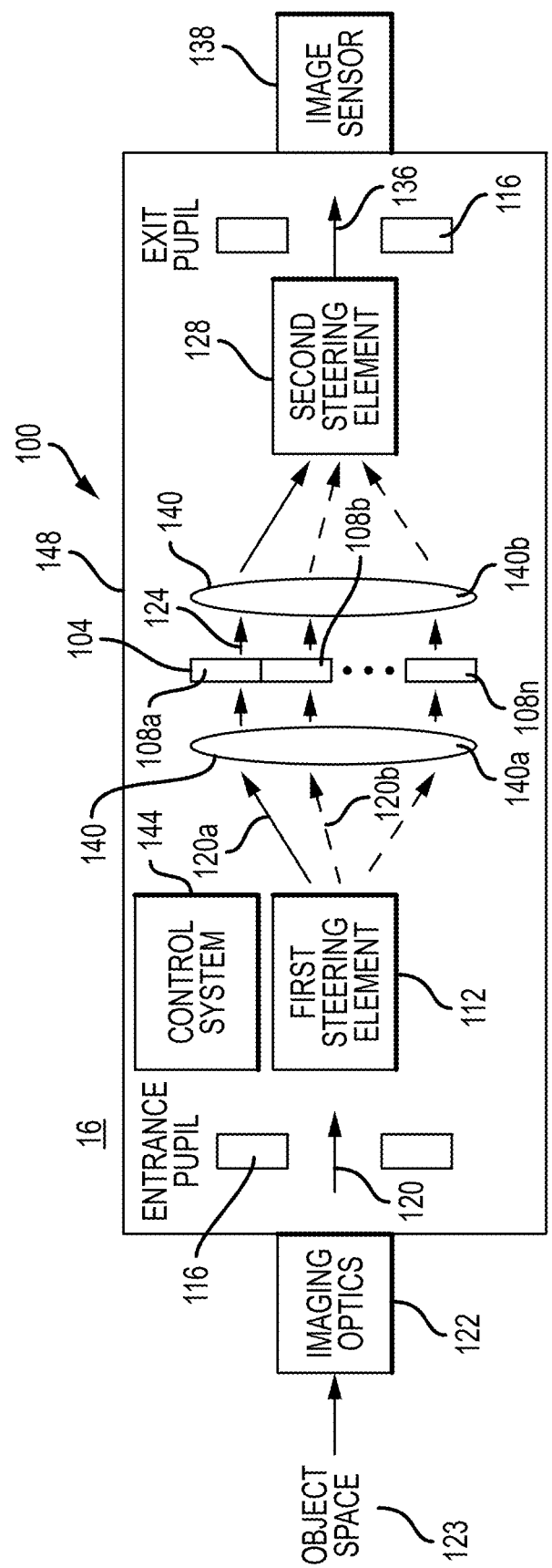
FIGS. 2A and 2B depict components of instruments incorporating optical filter systems in accordance with embodiments of the present disclosure.
Figure 2B:
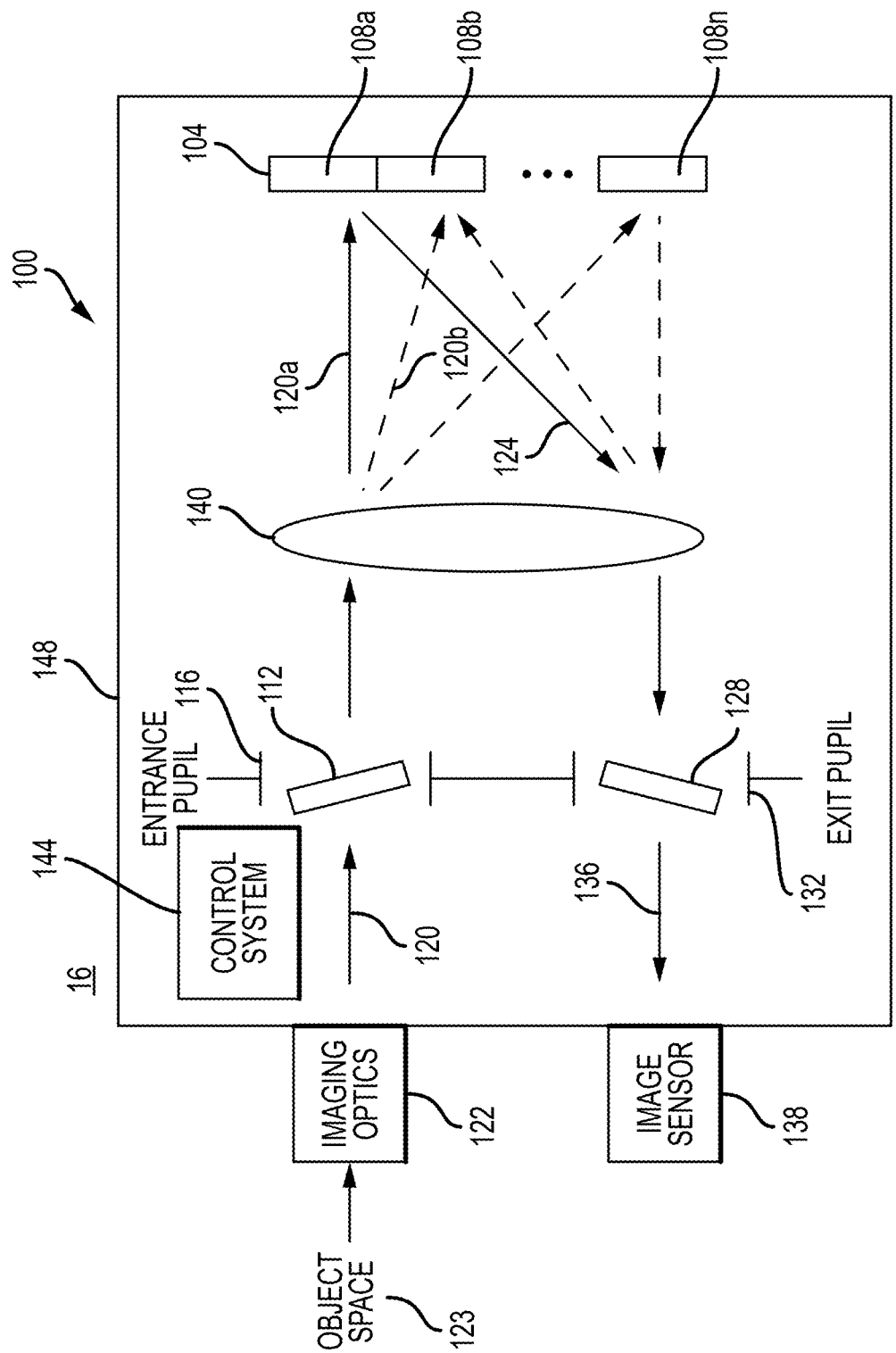
Figure 3A:
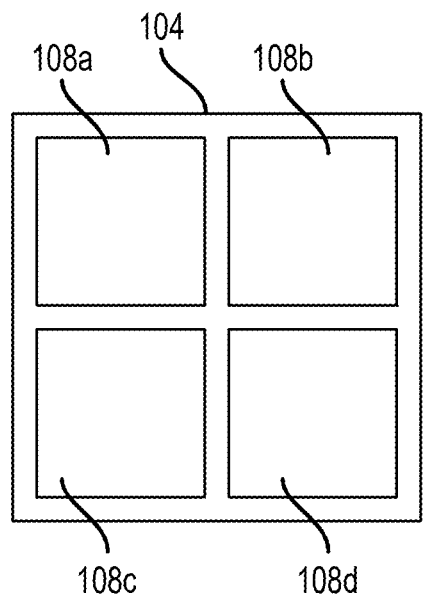
FIGS. 3A, 3B, 3C and 3D illustrate example implementations of a filter array in accordance with embodiments of the present disclosure.
Figure 3B:
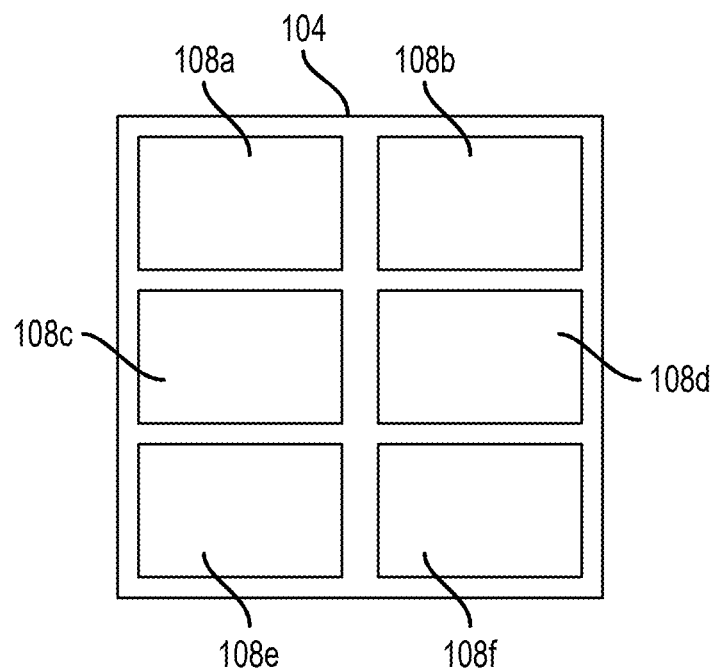
Figure 3C:
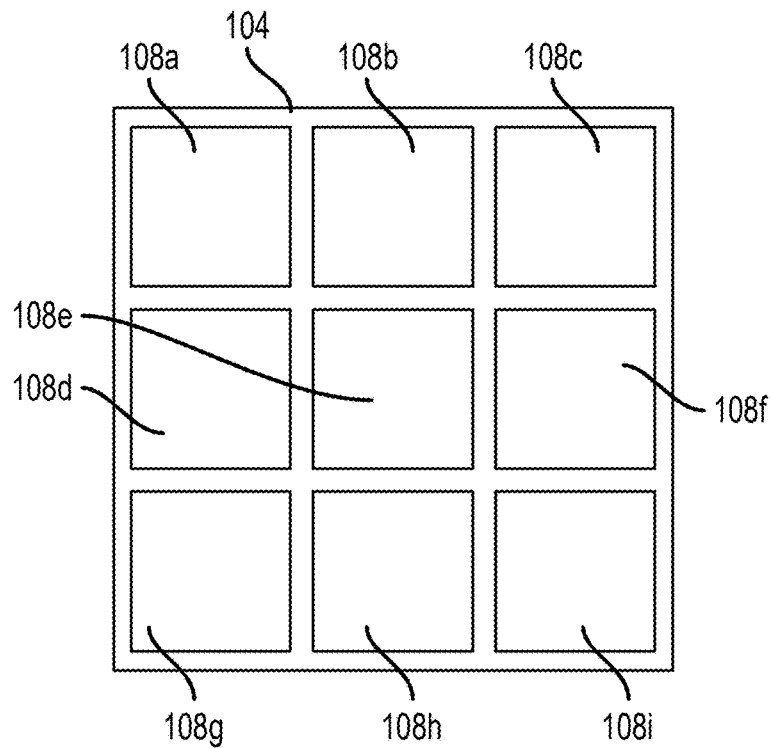
Figure 3D:
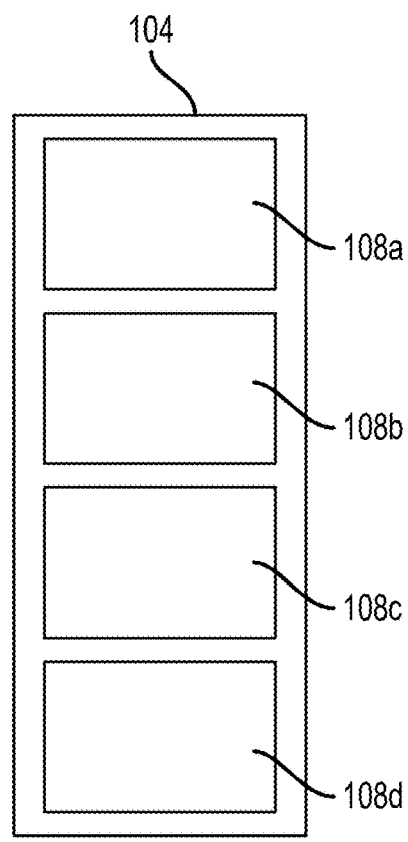

FIGS. 2A and 2B depict components of example optical instruments 16 having optical filter systems 100 in accordance with exemplary embodiments of the present disclosure. More particularly, FIG. 2A illustrates an optical instrument 16 incorporating an optical filter system 100 featuring a filter array 104 having transmissive filter elements 108, while FIG. 2B illustrates an optical instrument 16 incorporating an optical filter system 100 featuring a filter array 104 having reflective filter elements 108. The filter array 104 generally includes n filter elements 108 disposed in a fixed array, where n is greater than or equal to 2. Each of the filter elements 108 can have a different filtering effect on incident light. For example, each filter element 108 within the filter array 104 can transmit different wavelengths or polarizations of light as compared to other filter elements 108 in the filter array 104. In accordance with at least some embodiments of the present disclosure, filter elements 108 of the filter array 104 are disposed on or parallel to a common plane. Moreover, the filter elements 108 can be sized and shaped to match a size and shape of the beam of received light 120 at the plane of the filter array 104. The filter elements 108 can be disposed in any number of rows and columns. As examples, but without limitation, the filter array 104 can include two rows and two columns of filter elements 108 (as depicted in FIG. 3A), the filter array 104 can include three rows and two columns of filter elements 108 (as depicted in FIG. 3B), the filter array 104 can include three rows and three columns of filter elements 108 (as depicted in FIG. 3C), or the filter array 104 can include four rows and one column of filter elements 108 (as depicted in FIG. 3D). Other configurations or arrangements of filter elements 108 within a filter array 104 are possible. In general, the filter array 104 configuration will depend on the number of filters 108 required or desired to realize the functional requirements of the optical filter system 100, and in particular the requirements of the optical filter system 100 in association with a particular system 12 or application.

An optical filter system 100 in accordance with embodiments of the present disclosure includes a fixed, patterned filter array 104 having a plurality of reflective or transmissive filter elements 108a-n. In accordance with at least some embodiments of the present disclosure, each filter element 108 has a different filtering effect on incident light. These filtering effects can be spectral and/or based on polarization. For example, a first filter element 108a can filter out all but blue light, a second filter element 108b can be panchromatic, a third filter element 108c filter out all but green light, and a fourth filter element 108d can filter out all but red light. As can be appreciated by one of skill in the art after consideration of the present disclosure, different filter characteristics of filter elements 108, and combinations of filter elements 108 within a filter array 104 are possible. For example, a filter element 108 can filter out all but infrared light, filter out wavelength bands that extend across multiple colors, or the like. As a further example, a filter element 108 can filter out all but circularly polarized light, or filter out light not linearly polarized in a selected direction. Moreover, a filter array 104 can include one or more filter elements 108 having spectral selectivity and one or more filter elements 108 having polarization selectivity.

With continued reference to FIGS. 2A and 2B, the optical filter system 100 includes a first steering element 112 at or adjacent the entrance pupil 116 of the optical filter system 100. In general, the entrance pupil 116 admits received light 120 that has been collected and collimated by imaging optics 122, such as a telescope. Accordingly, the received light 120 can comprise an image collected from an object space or scene 123. The first steering element 112 steers the received light 120 such that the received light 120 is incident on a selected one of the filter elements 108 of the filter array 104. In accordance with embodiments of the present disclosure, the entire area of the image included within the received light 120 is directed to the selected filter element 108.

The selected filter element 108 filters the received light 120, to produce filtered light 124. The filtered light 124 is received at a second steering element 128, which steers the filtered light 124 through the exit pupil 132 of the optical filter system 100 as a filtered and collimated output image or scene 136. More particularly, the second steering element 128 corrects the alignment of the light rays within the output image 136 so that they are properly received by a receiving optical system, such as an image sensor or imaging system 138. In accordance with embodiments of the present disclosure, the collimated output scene or image 136 encompasses the same field of view as the scene included in the received light 120. In accordance with still other embodiments of the present disclosure, the light included in the collimated output scene 136 includes no material alteration, except for the effect of the filtering performed by the selected filter element 108, as compared to the received light 120. In addition, embodiments of the present disclosure can provide filtering across the entire extent or across an entire field of view of the received light 120. In accordance with at least some embodiments of the present disclosure, an entire area of the received light 120, corresponding to an image encompassing a first field of view of the object space 123, is filtered by any one of the filter elements 108 of the filter array 104 simultaneously, to produce the filtered light 124, and this filtered light 124 fills the entire frame of the image sensor 138 on which it is incident. Accordingly, at least some embodiments of the present disclosure provide "full frame" filtration of light collected by an associated set of imaging optics 122, and imaged by an associated image sensor 138.

The first 112 and second 128 steering elements can be configured as reflective or refractive elements. The steering elements 112 and 128 are moveable elements, that operate to selectively steer the received 120 and filtered 124 light respectively. In particular, movement of the steering elements 112 and 128 enables the optical filter system 100 to selectively apply one of the plurality of filter elements 108 included in the filter array 104 to create filtered light 124 during selected periods of time. Accordingly, through movement of the first steering element 112, received light 120 comprising all or a portion of a field of view of an imaging system 122 can be directed to a selected filter element 108 within the filter array 104, and through a corresponding movement of the second steering element 128, the light filtered by the first selected filter element 108 can be directed to the image sensor 138. Moreover, through a further movement of the first steering element 112, received light 120 comprising the same extent of the field of view of the imaging optics 122 can be directed to a different selected filter element 108 within the filter array 104, and through a corresponding movement of the second steering element 128, the light filtered by the selected filter element 108 can be directed to the image sensor 138. Full frame filtration of received light 120 is therefore enabled by embodiments of the present disclosure. The movement of the steering elements 112 and 128 can be initiated by operation of a control system 144. For example, the control system 144 can operate to generate or pass a control signal to one or more actuators that move one or both of the steering elements 112 and 128 in response to receiving the control signal. As an example, but without limitation, the steering elements 112 and 128 are fast steering mirrors. In accordance with at least some embodiments of the present disclosure, movement of the steering elements 112 and 128 is synchronized.

In accordance with embodiments of the present disclosure, relay optics 140 are provided between the first steering element 112 and filter array 104, and between the filter array 104 and the second steering element 128. In particular, the relay optics 140 are configured as an optical system that defines a conjugate image plane at which the filter array 104 is located, and ensure that the received light 120 is telecentric at the filter array 104. Moreover, the entire field of view or scene is incident on a single filter element 108 of the filter array 104. The relay optics 140 can be provided as a single pass system, in which separate elements 140*a* and 140*b* are provided for the received 120 and filtered 124 light respectively (as in the embodiment illustrated in FIG. 2A), or the relay optics 140 can be a double pass system, in which different portions or areas of an integral element 140 serves to direct both received 120 and filtered 124 light (as in the embodiment illustrated in FIG. 2B). As discussed in greater detail elsewhere herein, the relay optics 140 can include reflective and/or refractive elements.

As examples, but without limitation, the control system 144 can include a processor, controller, computer, memory, data storage, motor, actuator, control signal input/output, power supply, and other components and systems. The control system 144 can operate to control the operation of the first 112 and second 128 steering elements. In particular, the control system 144 can operate to supply drive, control, or power signals to motors or actuators provided as part of the control system 144, as part of the first steering element 112, and/or as part of the second steering element 128, to position the steering elements 112 and 128 so that received light 120 is steered to the area of a desired filter element 108 at or during a selected period of time. The selection of the desired filter element 108 can be performed by a system or entity that is external to the optical filter system 100, or can be determined through operation of an included system, including by the control system 144, for example through the execution of program instructions or code stored in memory or data storage and executed by a controller or processor. In accordance with embodiments of the present disclosure, the steering elements 112 and 128 are implemented as fast steering mirrors. In accordance with at least some embodiments of the present disclosure, the optical design of the optical filter system 100 provides entrance 116 and exit 132 pupils with a 1:1 magnification ratio, and provides an afocal interface for user-defined or selected optical input (e.g. imaging optics 122) on the entrance pupil 116 and sensor instrumentation (e.g. image sensor system 138) on the exit pupil 132.

In accordance with at least some embodiments, the optical filter system 100 includes an integral chassis or frame 148 to which the other components of the optical filter system 100 are interconnected or mounted. The frame 148 can include mounting fixtures or surfaces for facilitating the interconnection of the optical filter system 100 to imaging optics 122 and to an image sensor system 138. In accordance with at least some embodiments of the present disclosure, the steering elements 112 and 128 are the only moving elements or components in the optical filter system 100.

Figure 4:
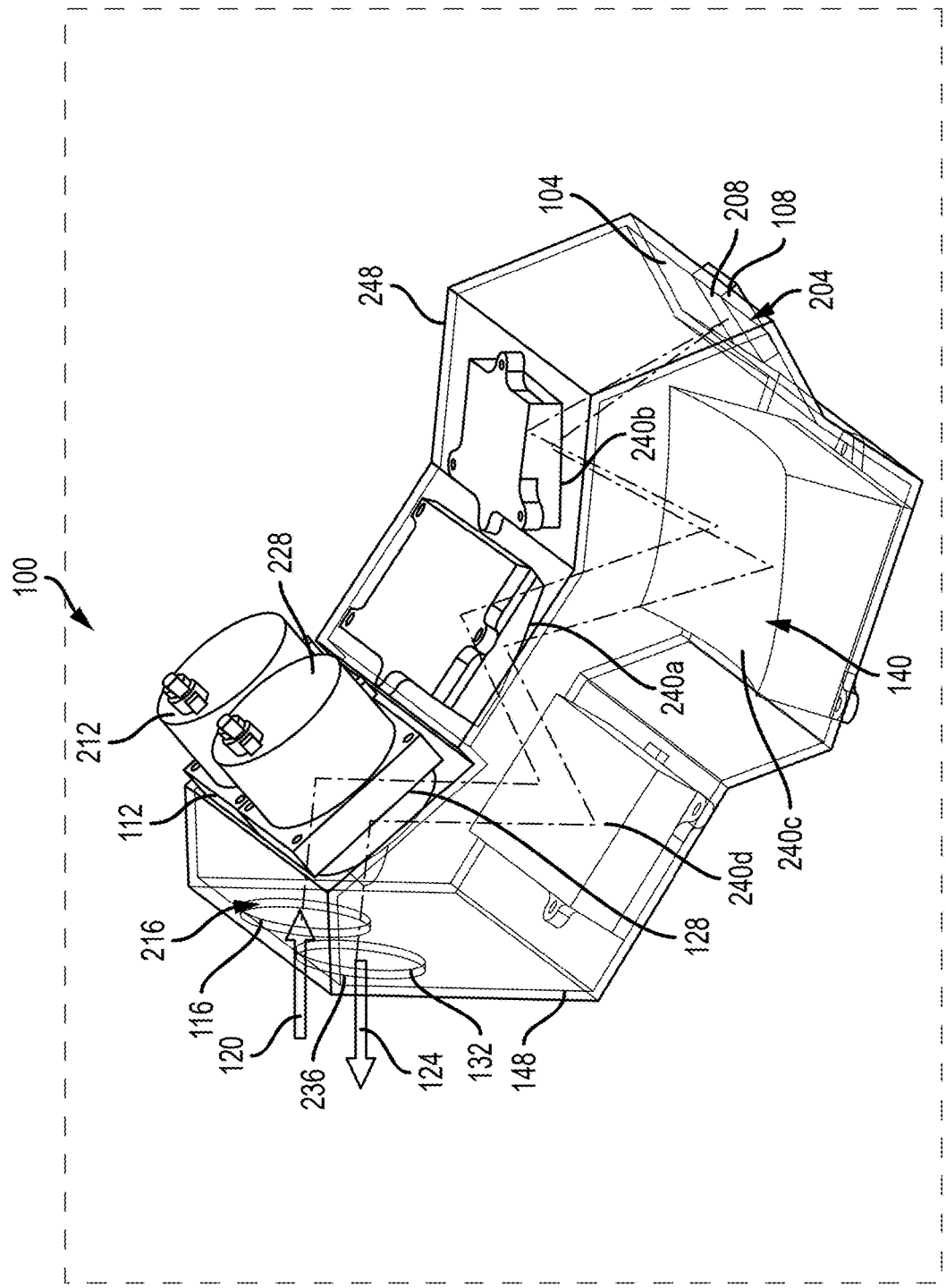
FIG. 4 illustrates an example implementation of an optical filter system in accordance with embodiments of the present disclosure.

FIG. 4 illustrates an example implementation of an optical filter system 100 in accordance with embodiments of the present disclosure. In this example, the first steering element 112 is implemented as a first fast steering mirror assembly 212, and the second steering element 128 is implemented as a second fast steering mirror assembly 228. As can be appreciated by one of skill in the art after consideration of the present disclosure, the fast steering mirror assemblies 212 and 228 can include a mirror surface connected to a set of actuators by a flexure, gimbal, or other structure. Moreover, the mirror surface can be moved in a number of different dimensions. Light is received through the entrance pupil 116, configured as an entrance aperture 216, and directed to a selected area of the filter array 104, corresponding to one of a plurality of included filter elements 108, by the fast steering mirror assembly 212. The filter array 104 in this embodiment is configured as a patterned reflective filter array 204, having a number of different patterned reflective filters 208. The light incident on the selected patterned filter element 208 of the reflective filter array 204 is provided as filtered light 124 that is directed out the exit pupil 132, configured as an exit aperture 236, by the second fast steering mirror assembly 228, to a receiving system. As shown, relay optics 140 are included. In this example, the relay optics 140 are provided as reflective optical elements 240*a*-*d*. In particular, in the illustrated example, the elements 240*a*-240*d* are comprised of off axis aspherical mirrors, with portions of each of the mirrors operating to reflect received light 120 and other portions of each of the mirrors operating to reflect filtered light 124. Accordingly, the optical filter system 100 illustrated in FIG. 4 is an example of a double pass reflective type optical filter system 100. In addition, the elements of the optical filter system 100 are interconnected to a common frame 148, in this example implemented as a housing 248. This example configuration also provides the entrance aperture 216 and the exit aperture 236 on a common plane of the housing 248, to which imaging optics 122 and an imaging sensor system 138 can be connected.

As depicted in the example configuration of FIG. 4, an optical filter system 100 as disclosed herein can provide an output beam of filtered light 124 that is at a different location but on the same plane as the beam of received light 120. Moreover, the second steering element 128 places the beam of filtered light on the optical axis of a receiving sensor or system, regardless of the location within the filter array 104 of the filter element 108 that has been used to produce the filtered light. The double-pass reflective optical relay of at least some embodiments of the present disclosure reduces the overall volume of the optical filter system 100 and places the entrance pupil 116 and the exit pupil 128 on the same mechanical plane, which simplifies the input/output optomechanical interface as compared to at least some alternative configurations. The various components of the optical filter system 100 can be mounted on or within a unitary structure or housing 248. Moreover, the only moving components are those associated with the fast steering mirror assemblies 212 and 228. In accordance with at least some embodiments of the present disclosure, the invention utilizes additive manufacturing to achieve single part construction. In accordance with still other embodiments, the housing 248 can be configured as a multifunctional structure that combines baffles, light blocking, and optical element mounts.

Figure 5:
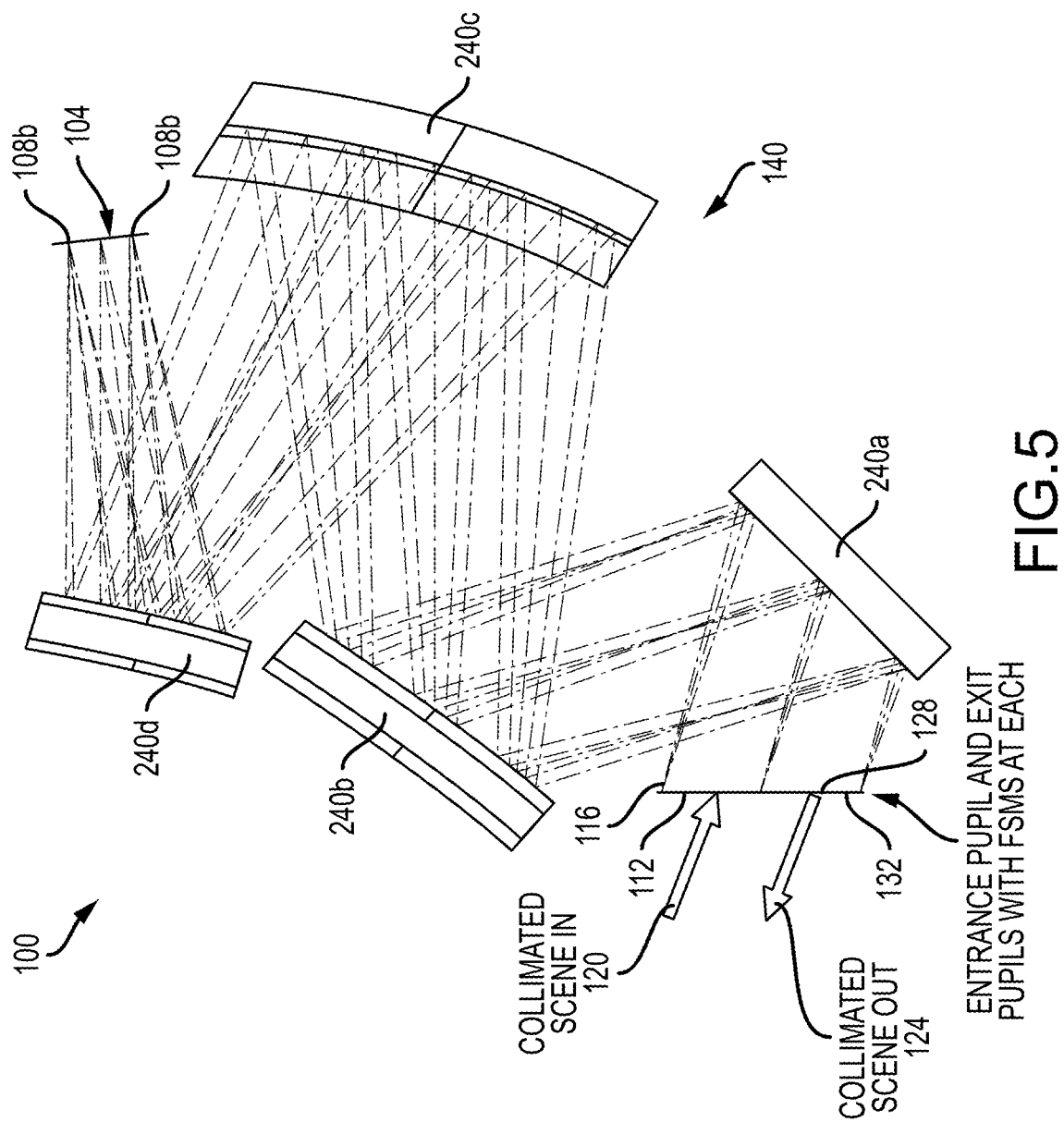
FIG. 5 is a ray diagram depicting an example implementation of an optical filter system in accordance with embodiments of the present disclosure.

FIG. 5 is a ray diagram depicting an example implementation of an optical filter system 100 in accordance with embodiments of the present disclosure, and in particular illustrates the passage of light rays through an optical filter system 100 configured as a double pass reflective type optical filter system 100 (such as the embodiment illustrated in FIG. 4). As depicted, light 120 is received as a collimated scene or image. The received light 120 is then directed by the first steering element 112, in cooperation with relay optics 140, such that the entire scene or image within the received light is directed to a selected filter element 108 within the filter array 104. More particularly, the received light 120, as steered by the first steering element 112, is in this example reflected by elements of the relay optics 140, here including a first mirror 240a, a second mirror 240b, a third mirror 240c, and a fourth mirror 240d. The mirrors 240 are configured to deliver the steered light to the filter array 104 as a telecentric image or set of rays. Moreover, except for shifting the scene included in the received light 120 within a conjugate image plane at the filter array 104 such that the received and shifted light is all incident on a single selected filter element 108, the image is not spatially altered. As suggested by the relative scale of the components depicted in at least some of the figures, the area of each filter element 108 within a filter array 104 can be smaller than the area of the beam of received light 120 at the entrance pupil 116. In such embodiments, the optical system relay optics 140 scale the received and steered light so that the beam encompassing the entire image within the received light is no larger than the area of the selected filter element 108. The relay optics 140 can further rescale the filtered light so that an area of the filtered light at the exit pupil 132 is equal to the area of the received light at the entrance pupil 116.

Figure 6:
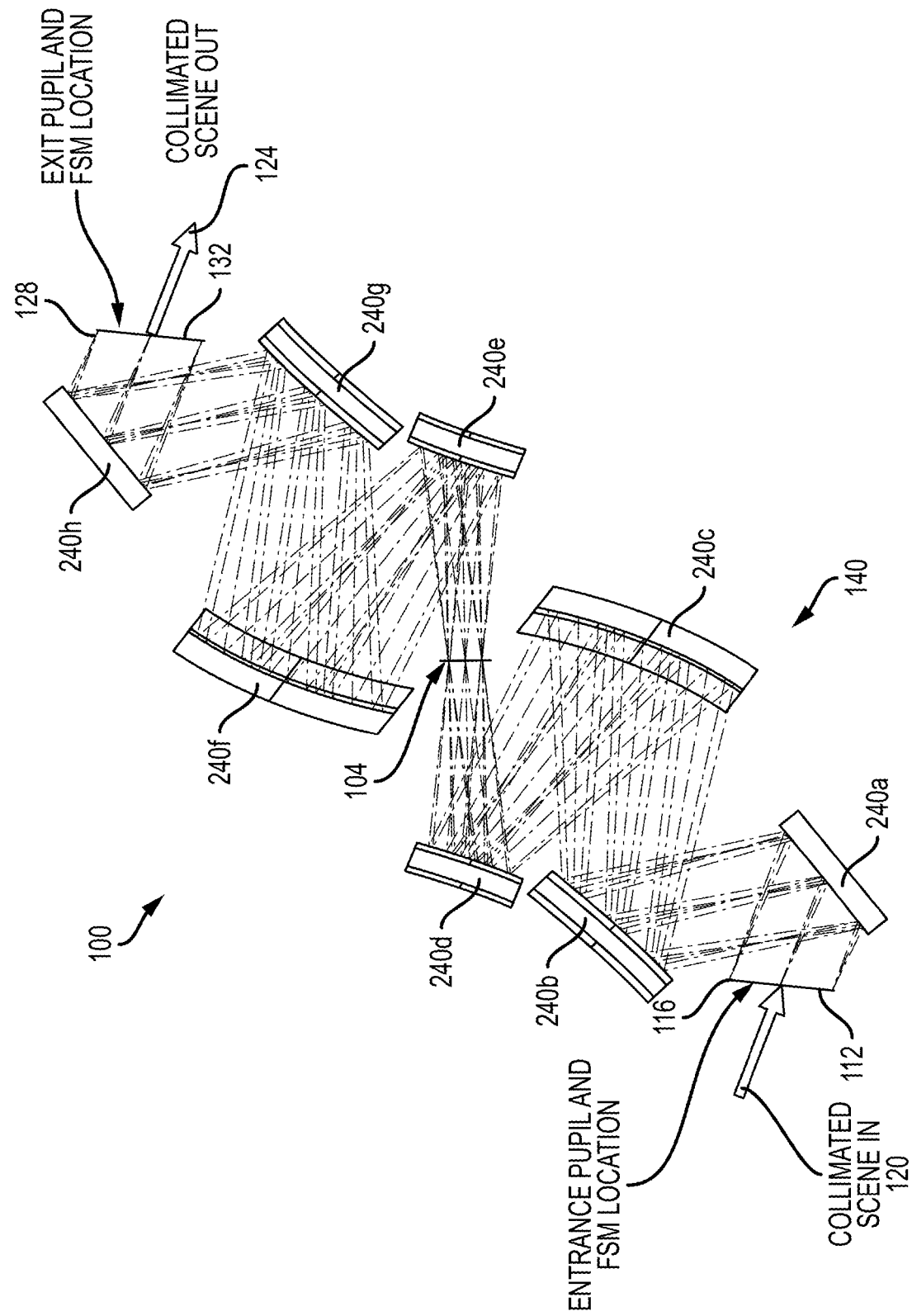
FIG. 6 is a ray diagram depicting an example implementation of an optical filter system in accordance with other embodiments of the present disclosure.

FIG. 6 is a ray diagram depicting an example implementation of an optical filter system 100 in accordance with other embodiments of the present disclosure, and in particular illustrates the passage of light rays through an optical filter system 100 configured as a single pass reflective type optical system 100. As in other embodiments of the present disclosure, light 120 is received as a collimated scene or image, and is steered by a first steering element 112 toward a selected filter element 108 of a filter array 104. Also, like the embodiment illustrated in FIG. 5, this embodiment includes optical system relay optics 140 that feature a plurality of mirrors 240. However, as a single pass system, the mirrors 240 are divided into a first set of mirrors 240a-240d disposed on an input side of the filter array 104, and a second set of mirrors 240e-240h disposed on an output side of the filter array 104. Moreover, in this example, the filter array 104 includes a plurality of transmissive filter elements 108. Like other embodiments, steering of the received image at the entrance pupil 116 can be performed by a first steering element 112, such as a first fast steering mirror 212, and steering of the filtered image at the exit pupil 132 can be performed by a second steering element 128, such as a second fast steering mirror 228.

Figure 7:
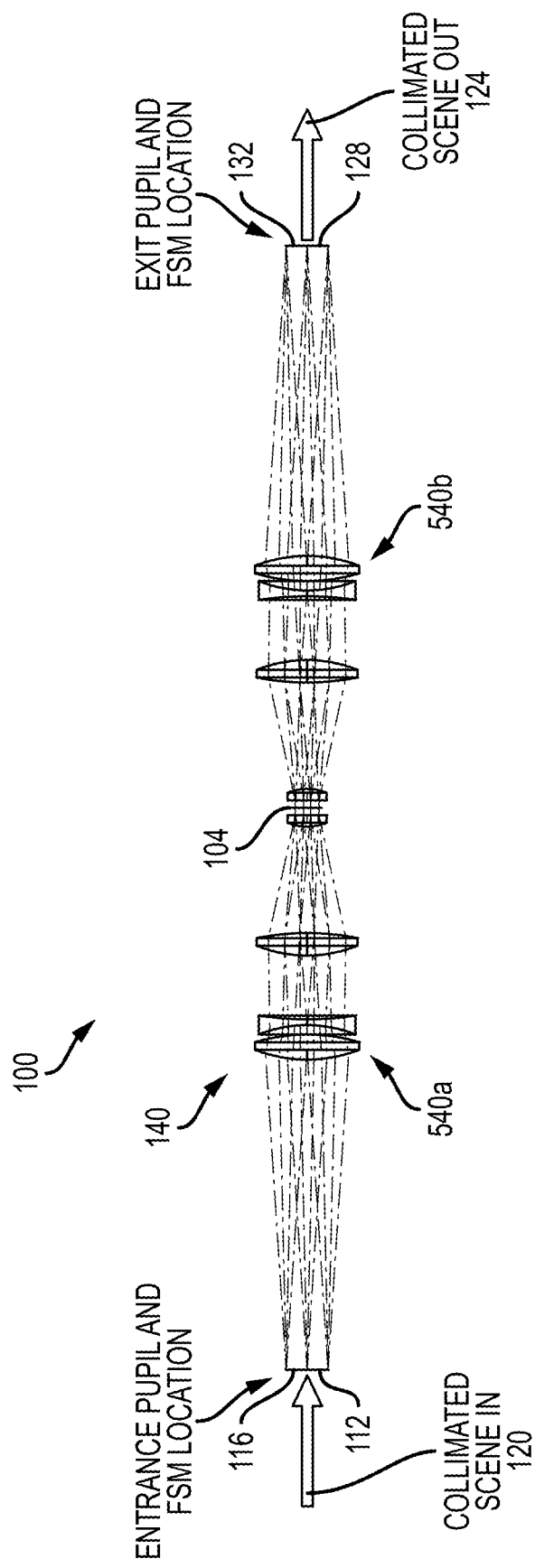
FIG. 7 is a ray diagram depicting an example implementation of an optical filter system in accordance with still other embodiments of the present disclosure.

FIG. 7 is a ray diagram depicting an example implementation of an optical filter system 100 in accordance with embodiments of the present disclosure, and in particular illustrates the passage of rays through an optical filter system 100 configured as a single pass refractive type optical system. Accordingly, in this embodiment, the relay optics 140 include a first series of refractive lenses or elements 540a on an input side of the filter array 104, and a second series of refractive lenses 540b on an output side of the filter array 104. As in the single pass reflective system of FIG. 6, the filter array 104 in this example includes a plurality of transmissive filter elements 108. Steering of the received image at the entrance pupil 116 can be performed by a first steering element 112, such as a first fast steering mirror 212, and steering of the filtered image at the exit pupil 132 can be performed by a second steering element 128, such as a second fast steering mirror 228.

Figure 8:
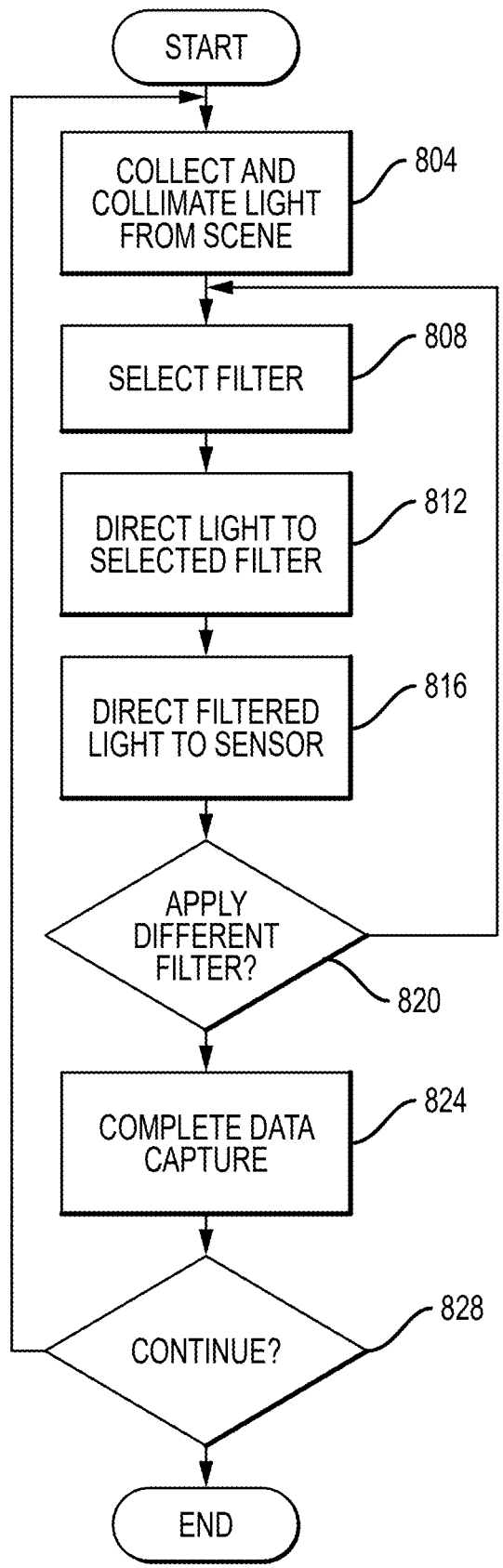
FIG. 8 is a flowchart illustrating aspects of a method for rapid optical filter switching in accordance with embodiments of the present disclosure.

With reference now to FIG. 8, aspects of a method for filtering light in accordance with embodiments of the present disclosure are provided. As can be appreciated by one of skill in the art after consideration of the present disclosure, operations and methods as disclosed herein can be implemented, entirely or partially, through the execution of programming code or instructions by a control system 144 included as part of the optical filter system 100. Initially, at step 804, light is collected from a scene. For example, but without limitation, light can be collected from an object space 123 within a field of view of the imaging optics 122, such as a telescope. Moreover, the output of the imaging optics 122 can be collimated light. In accordance with embodiments of the present disclosure, the light output by the imaging optics 122 is provided to an optical filter system 100 having a filter array 104 that includes a plurality of filter elements 108 as received light 120 (see FIGS. 2A and 2B).

At step 808, a filter element 108 within a filter array 104 is selected. More particularly, a filter element 108 capable of providing a desired filter effect is selected. Examples of possible filter effects that can be provided by different filter elements 108 within a filter array 104 include wavelength selectivity and polarization selectivity. Moreover, the filter elements 108 can be implemented as transmissive or reflective filters.

The received light 120 is then directed to the selected filter element 108 (step 812). In accordance with embodiments of the present disclosure, directing the received light 120 to a selected filter element 108 includes operating a first steering element 112 to direct the beam comprising the received light 120 to the area of the filter array 104 in which the selected filter element 108 is disposed. In accordance with embodiments of the present disclosure, operating the first steering element 112 can include providing a control signal to an actuator associated with the first steering element 112 to position the optical steering element (e.g. the mirror or refractive elements) of the first steering element 112 to steer the received light 120 so that the beam of received light 120 is incident on the area of the selected filter element 108. For example, and with continued reference to FIGS. 2A and 2B, where a first filter element 108a is selected, the first steering element 112 is operated to direct the received light 120 over a first path or direction 120a. Where a second filter element 108b is selected, the first steering element 112 is operated to direct the received light 120 over a second path or direction 120b. Similarly, where an nth filter element 108n is selected, the first steering element 112 is operated to direct the received light 120 over an nth path or direction 120n. In accordance with embodiments of the present disclosure, the entire beam of received light 120, encompassing the entire field of view of the imaging optics 122, can be directed to the selected filter element 108.

The light filtered by the selected filter element 108, referred to herein as the filtered light 124, is then directed to a sensor system 138 (step 816). Directing the filtered light 124 to a sensor system 138 includes operating a second steering element 128 to direct the beam comprising the filtered light 124 to an image sensor. In accordance with embodiments of the present disclosure, image sensor can be provided as part of a sensor system 138 positioned at or adjacent the exit pupil 132 of the optical filter system 100.

The sensor system 138 can then be operated to collect data. For example, where the sensor system 138 includes a solid state image sensor having a plurality of pixels, those pixels can be operated to generate charge in response to exposure to the filtered light 124. As another example, a photosensitive material provided as part of the sensor system 138 can be exposed to the filtered light through the opening of a shutter mechanism. In accordance with further embodiments of the present disclosure, the image sensor is configured to collect image information from over the entire field of view of the received light 120 collected by the imaging optics 122. Accordingly, embodiments of the present disclosure implement "full frame" filtering of image data.

In accordance with embodiments of the present disclosure, different filter effects can be applied within a single image sensor integration period. Therefore, at step 820, a determination is made as to whether a different filter element 108 and therefore a different filtration effect, should be applied to the received light 120. If it is determined that a different filtration effect should be applied to the received light 120, the process can return to step 808, and the filter element 108 corresponding to the desired additional filter effect is selected. The steps of directing light to the selected filter (step 812), directing the filtered light 124 to a sensor (step 816), and determining whether yet another filter element 108 should be applied (step 820) are then repeated.

Once a determination is made at step 820 that application of a different filter element 108 is not required, the data capture operation is completed (step 824). As an example, completion of the data capture operation can include discontinuing the provision of filtered light 124 to an image sensor by closing a shutter, discontinuing the generation of charge by pixels included as part of the image sensor, and/or reading out charge from pixels included as part of the image sensor. Completion of the data capture operation can also include resetting the image sensor so that it is ready to capture a next frame of image data.

At step 828, a determination can be made as to whether operation of the optical filter system 100 should continue. If operation is to continue, the process can return to step 804. Alternatively, the process can end.

In operating an optical filter system 100 and/or performing a method for filtering light as disclosed herein, a process is disclosed in which received light is directed to different areas comprising different filter elements 108 included as part of a filter array 104. Moreover, as illustrated in FIGS. 3A-3D, the filter elements 108 of a filter array 104 can be disposed in one or more rows and columns. Accordingly, as can be appreciated by one of skill in the art after consideration of the present disclosure, steering a beam of received light 120 to a desired filter element 108 can include moving the beam of received light 120 in one or two dimensions. In addition, the filter elements 108 can be configured to provide a selected filtration effect across an entire area of a field of view encompassed by the beam of received light 120. The resulting beam of filtered light 124 can then be delivered so as to be incident across an entire operative surface area of an image sensor. Accordingly, embodiments of the present disclosure provide full frame filtration of light within a field of view of an optical instrument 16 incorporating or associated with an optical filter system 100 as disclosed herein.

A filter array 104 in accordance with embodiments of the present disclosure can have any number of reflective or transmissive filter elements 108, and the filter elements 108 can have any shape or shapes. In accordance with embodiments of the present disclosure, each filter element 108 is sized and shaped so as to receive the entire scene encompassed by the received light 120 within the area of the individual filter element 108, at the plane of the filter array 104, when the received light 120 has been steered to that filter element 108 by the first steering element 112. Moreover, through operation of the first steering element 112, any one of the filter elements 108 within the filter array 104 can be accessed in any order. In accordance with at least some embodiments of the present disclosure, the filter array 104 is telecentric, and is at a conjugate image plane of the optical filter system 100.

As can be appreciated by one of skill in the art after consideration of the present disclosure, an optical filter system 100 can provide for extremely fast switching of filter characteristics applied to an entire image or scene. In particular, by enabling a particular filter element 108, and thus a particular filter characteristic, to be selected by shifting a location of the image within a plane using extremely high speed optomechanical scanning elements, such as fast steering mirrors, extremely fast switching times are enabled. This ability to quickly shift between different areas of the filter array to access different filter elements 108 is further enabled by configuring embodiments of the present disclosure such that the steering elements 118 and 128 are required to travel short angular distances. Moreover, embodiments of the present disclosure provide optomechanical advantages over alternative filter designs in which filters are moved into and out of the optical path. Accordingly, the high-speed acquisition of images and subjecting those images to different filter characteristics is supported. In accordance with at least some embodiments of the present disclosure, switching between different filter elements 108 can even be performed during a single image sensor integration period. Embodiments of the present disclosure further allow for switching between different filter elements 108 in any sequence or order.

As discussed herein, filtering of an entire field of view collected by imaging optics 122 and delivered to an image sensor system 138 can be performed by an optical filter system 100 in accordance with embodiments of the present disclosure. In accordance with alternate embodiments, filtration can be formed on selected areas or portions of the field of view. The time required for switching between filter elements 108 in optical filter systems 100 in accordance with embodiments of the present disclosure is relatively small, and is governed by the step and settle times of the steering elements 112 and 128.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. An optical filter system, comprising:
   a first steering element;
   relay optics, wherein the relay optics include at least a first relay optics element; and
   a filter array, wherein the filter array includes a plurality of filter elements, wherein the first steering element receives light encompassing a first field of view through an entrance pupil of the optical filter system, wherein locations of the filter elements of the filter array relative to the entrance pupil of the optical filter system are fixed, wherein the first steering element is operable to direct the received light encompassing the first field of view and received through the entrance pupil of the optical filter system to be incident on a selected one of the filter elements, wherein, with the first steering element operated to direct the received light to a first filter element of the plurality of filter elements, the received light is directed to the first filter element via the first relay optics element, wherein, with the first steering element operated to direct the received light to a second filter element of the plurality of filter elements, the received light is directed to the second filter element via the first relay optics element, and wherein the selected filter element applies an associated filtering effect to the light encompassing the first field of view.

2. The optical filter system of claim 1, wherein different filter elements of the filter array apply different filtering effects to incident light.

3. The optical filter system of claim 1, further comprising:
a control system, wherein the first steering element is moved in response to a direction from the control system to direct the received light encompassing the first field of view and received through the entrance pupil of the optical filter system to the selected filter element.

4. The optical filter system of claim 1, further comprising:
a second steering element, wherein the second steering element is operable to direct light filtered by the selected filter element to an exit pupil of the optical filter system.

5. The optical filter system of claim 4, wherein movements of the first and second steering elements are synchronized to one another.

6. The optical filter system of claim 4,
wherein at least a first portion of the first relay optics element is disposed along an optical path between the first steering element and the first filter element, and wherein at least a second portion of the first relay optics element is disposed along an optical path between the first steering element and the second filter element.

7. The optical filter system of claim 6, wherein the relay optics further include a second relay optics element between the filter array and the second steering element, wherein at least a first portion of the second relay optics element is disposed along an optical path between the first filter element and the second steering element, and wherein at least a second portion of the second relay optics element is disposed along an optical path between the second filter element and the second steering element.

8. The optical filter system of claim 7, wherein the first relay optics element provides the light within the first field of view to the selected filter element as telecentric light, and wherein the second relay optics element provides the light filtered by the selected filter element, encompassing the first field of view; and steered by the second steering element to an exit pupil of the optical filter system as telecentric light.

9. The optical filter system of claim 4, wherein the first and second steering elements are mirrors.

10. The optical filter system of claim 9, wherein the relay optics include a plurality of mirrors.

11. The optical filter system of claim 4, wherein the first and second steering elements are refractive elements.

12. The optical filter system of claim 6, wherein the optical filter system is afocal.

13. The optical filter system of claim 6, wherein a sensor is positioned to receive the light filtered by the optical filter system and encompassing the first field of view.

14. The optical filter system of claim 4, wherein the entrance pupil and the exit pupil of the optical filter system are on a same plane.

15. The optical filter system of claim 4, wherein the plurality of filter elements are transmissive.

16. The optical filter system of claim 3, wherein the plurality of filter elements are reflective.

17. The optical filter system of claim 6, wherein at least a third portion of the first relay optics element is disposed along an optical path between the first filter element and the second steering element, and wherein at least a fourth portion of the first relay optics element is disposed along an optical path between the second filter element and the second steering element.

18. The optical filter system of claim 4, wherein the first and second steering elements individually move about first and second axes.

19. A method for filtering light, comprising:
providing a filter array having a plurality of filter elements;
receiving light encompassing a first field of view at an entrance pupil;
steering the received light encompassing the first field of view at a first angle relative to the filter array and towards a selected first one of the filter elements via a first relay optics element during a first period of time to produce first filtered light, wherein at least a first portion of the first relay optics element is disposed along an optical path between the entrance pupil and the selected first one of the filter elements;
steering the first filtered light encompassing the first field of view to an exit pupil;
steering the received light encompassing the first field of view at a second angle relative to the filter array and towards a selected second one of the filter elements via the first relay optics element during a second period of time to produce second filtered light, wherein at least a second portion of the first relay optics element is disposed along an optical path between the entrance pupil and the selected second one of the filter elements; and
steering the second filtered light encompassing the first field of view to the exit pupil.

20. The method of claim 19, wherein the received light encompassing a first field of view is an image of a scene, and wherein the first filtered light steered to an exit pupil includes a first filtered version of an entire image of the scene encompassed by the first field of view.

21. The method of claim 19, further comprising:
collecting light from within the first field of view from a scene using imaging optics, wherein the imaging optics provide the collected light to the entrance pupil; and
sensing an image encompassing the first field of view using an image sensor that receives light steered to the exit pupil.

22. An optical system, comprising:
an imaging optical system, wherein the imaging optical system collects light within a first field of view from an object space;
an optical filter system, including:
   an entrance pupil, wherein light collected by the imaging optical system is received by the optical filter system at the entrance pupil;
   a first steering element;
   relay optics, wherein the relay optics include a first relay optics element;
   a fixed pattern filter array, wherein the fixed pattern filter array includes at least a first filter element and a second filter element;
   a second steering element;
   an exit pupil; and
   a control system, wherein the first steering element is operable to direct the light received at the entrance pupil to a selected first one of the filter elements included in the fixed pattern filter array via a first portion of the first relay optics element in response to a first signal from the control system, wherein the first steering element is operable to direct the light received at the entrance pupil to a selected second one of the filter elements included in the fixed pattern filter array via a second portion of the first relay optics element in response to a second signal from the control system, wherein the second steering element is operable to direct light that is reflected from or passed by the selected one of the filter elements to the exit pupil as filtered light, and wherein the filtered light encompasses the first field of view; and
an image sensor system, including:
   an image sensor, wherein the filtered light encompassing the first field of view is incident on the image sensor.

23. The optical system of claim 22, wherein filters included in the filter array are located at a conjugate image plane.

24. The optical system of claim 22, wherein a 1:1 magnification ratio is applied between the entrance pupil and the exit pupil.

25. The optical system of claim 22, wherein the second steering element and the exit pupil are between the fixed pattern filter array and the image sensor.

* * * * *